United States Patent
Schultz et al.

(10) Patent No.: US 12,466,462 B2
(45) Date of Patent: Nov. 11, 2025

(54) LOW PROFILE ENERGY ABSORPTION STRAP LOCK MECHANISM

(71) Applicant: Steering Solutions IP Holding Corporation, Saginaw, MI (US)

(72) Inventors: Zachery P. Schultz, Saginaw, MI (US); Jimm Neifert, Grand Blanc, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 27 days.

(21) Appl. No.: 18/422,109

(22) Filed: Jan. 25, 2024

(65) Prior Publication Data

US 2025/0242854 A1    Jul. 31, 2025

(51) Int. Cl.
*B62D 1/184*    (2006.01)
*B62D 1/185*    (2006.01)

(52) U.S. Cl.
CPC .............. *B62D 1/184* (2013.01); *B62D 1/185* (2013.01)

(58) Field of Classification Search
CPC ................................. B62D 1/184; B62D 1/185
See application file for complete search history.

(56) References Cited

U.S. PATENT DOCUMENTS

| | | | | |
|---|---|---|---|---|
| 8,438,944 | B2* | 5/2013 | Ridgway | B62D 1/195 74/495 |
| 10,343,707 | B2* | 7/2019 | Kreutz | B62D 1/184 |
| 11,623,678 | B2* | 4/2023 | Anspaugh | B62D 1/192 280/775 |
| 11,866,089 | B1* | 1/2024 | Wen | B62D 1/189 |
| 11,866,092 | B1* | 1/2024 | Su | B62D 1/187 |
| 2010/0300236 | A1* | 12/2010 | Goulay | B62D 1/184 74/493 |
| 2013/0205935 | A1* | 8/2013 | Buzzard | B62D 1/184 74/495 |
| 2017/0066468 | A1* | 3/2017 | Tomiyama | B62D 1/184 |
| 2018/0111640 | A1* | 4/2018 | Bodtker | B62D 1/181 |
| 2020/0324802 | A1* | 10/2020 | Buzzard | B62D 1/189 |

(Continued)

FOREIGN PATENT DOCUMENTS

| | | | | |
|---|---|---|---|---|
| DE | 102008007094 A1 | * | 9/2009 | B62D 1/184 |
| WO | WO-2019147033 A1 | * | 8/2019 | B62D 1/184 |

OTHER PUBLICATIONS

Kramer et al., Locking device for longitudinal- and/or elevational adjustable steering column of motor vehicle, has guiding surface arranged in recess of engaging element, Sep. 10, 2009, EPO, DE 10 2008 007 094 A1, Machine Translation of Description (Year: 2009).*

*Primary Examiner* — James A English
(74) *Attorney, Agent, or Firm* — Dickinson Wright PLLC

(57) ABSTRACT

A lock mechanism for a steering column assembly includes an energy absorption strap having a first plurality of teeth formed thereon. The lock mechanism also includes a teeth plate having a second plurality of teeth formed thereon. The lock mechanism further includes a pair of springs in contact with an outer side of a teeth plate, the pair of springs biasing the teeth plate to a locked position, the locked position defined by engagement of the first plurality of teeth with the second plurality of teeth. The lock mechanism yet further includes a pair of cams in contact with an inner side of the teeth plate, wherein rotation of the pair of cams moves the second plurality of teeth out of engagement with the first plurality of teeth to define the unlocked position.

14 Claims, 4 Drawing Sheets

(56) References Cited

U.S. PATENT DOCUMENTS

2024/0326897 A1* 10/2024 Veeraraghavan ...... B62D 1/187
2024/0351628 A1* 10/2024 Wen ....................... B62D 1/192
2024/0367707 A1* 11/2024 Buzzard ................. B62D 1/184

* cited by examiner

LOW PROFILE ENERGY ABSORPTION STRAP LOCK MECHANISM

TECHNICAL FIELD

The following description relates to vehicle steering systems and, more particularly, to a low profile energy absorption strap lock mechanism for vehicle steering systems.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions to provide flexibility in the location of the hand wheel and facilitate more comfortable driving positions for different sizes of drivers or autonomous driving capability.

In addition to providing adjustability, axially adjustable steering column assemblies may also include a collapsible functionality that provides safety advantages during an energy absorption event. A locking mechanism may be required to maintain a moveable portion of the steering column assembly at a desired position after axial adjustment. One type of commonly used locking mechanism in the automotive industry is called a telescoping positive lock mechanism. When designing a telescoping positive lock mechanism, attention is typically paid to allow for proper column locked and unlocked conditions. The unlocked condition must ensure for the allowance of full telescopic/axial range of adjustment. When the steering column assembly is locked, the steering column assembly must maintain a fixed telescopic/axial position while under normal vehicle operating conditions. However, during a collapse event various measures may be implemented to ensure a required collapse condition and/or range of motion while within a range applied load.

Some manually adjustable steering column assemblies utilize a telescope eccentric cam to provide a locked and unlocked telescope condition for the steering column. Such assemblies typically require one or more complex appendages on the lever that is grasped by a driver to react with a toothed mechanism which interacts with an energy absorption strap. Additionally, most overall assemblies require a large packaging space and are challenged to comply with OEM spatial requirements.

SUMMARY

According to one aspect of the disclosure, an axially adjustable steering column includes an upper jacket. The steering column also includes a lower jacket, wherein the upper jacket is axially adjustable relative to the lower jacket. The steering column further includes an adjustment lever. The steering column yet further includes a lock mechanism, wherein the adjustment lever selectively moves the lock mechanism between a locked position and an unlocked position, wherein the locked position prevents axial adjustment of the upper jacket relative to the lower jacket in both axial directions, and the unlocked position allows adjustment of the upper jacket relative to the lower jacket. The lock mechanism includes an energy absorption strap operatively coupled to the upper jacket, the energy absorption strap having a first plurality of teeth formed thereon. The lock mechanism also includes a teeth plate operatively coupled to the lower jacket, the teeth plate having a second plurality of teeth formed thereon. The lock mechanism further includes a clamp bolt operatively coupled to the adjustment lever. The lock mechanism yet further includes a first cam operatively coupled to the clamp bolt, wherein rotation of the adjustment lever causes rotation of the first cam, wherein rotation of the first cam selectively moves the second plurality of teeth into and out of engagement with the first plurality of teeth to define the locked position and the unlocked position, respectively.

According to another aspect of the disclosure, a lock mechanism for a steering column assembly includes an energy absorption strap having a first plurality of teeth formed thereon. The lock mechanism also includes a teeth plate having a second plurality of teeth formed thereon. The lock mechanism further includes a pair of springs in contact with an outer side of a teeth plate, the pair of springs biasing the teeth plate to a locked position, the locked position defined by engagement of the first plurality of teeth with the second plurality of teeth. The lock mechanism yet further includes a pair of cams in contact with an inner side of the teeth plate, wherein rotation of the pair of cams moves the second plurality of teeth out of engagement with the first plurality of teeth to define the unlocked position.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
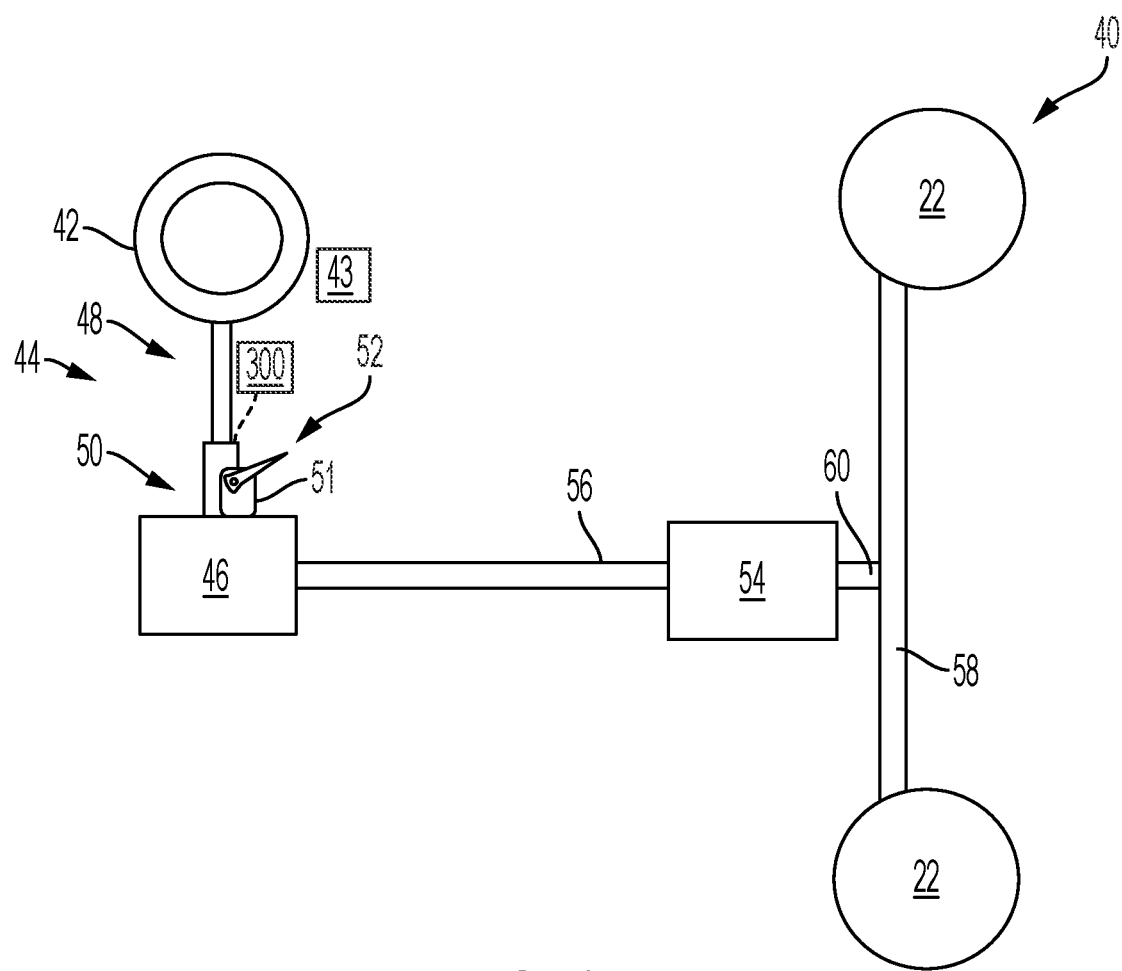
FIG. 1 schematically depicts a steering system including an adjustable steering column assembly.

The following discussion is directed to various embodiments of the disclosure. The embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Referring now to the drawings, where the various embodiments are shown and described herein, without limiting same, the Figures illustrate embodiments of a steering column assembly that is axially adjustable and includes a lock mechanism that is more compact and less complex than prior lock mechanisms. The axial adjustability can result from relative movement between two or more jackets that permit axial movement therebetween. For example, a first jacket and a second jacket move in a relative telescopic, sliding, or translational configuration.

Referring initially to FIG. 1, a steering system 40 for a vehicle is generally illustrated according to the principles of the present disclosure. The vehicle may include any suitable vehicle, such as a car, a truck, a sport utility vehicle, a mini-van, a crossover, any other passenger vehicle, any suitable commercial vehicle, or any other suitable vehicle. Moreover, principles of the present disclosure may apply to other vehicles, such as aircrafts, boats, trains, drones, or other vehicles.

The steering system 40 may be configured as a driver interface steering system, an autonomous driving system, or a system that allows for both driver interface and autonomous steering.

The steering system includes an input device 42, such as a steering wheel, wherein a driver may mechanically provide a steering input by turning the steering wheel. An airbag device 43 may be located on or near the input device 42. A steering column assembly 44 extends along an axis from the input device 42 to an output assembly 46. The output assembly 46 may include a pinion shaft assembly, an I-shaft, a cardan joint, steer-by-wire components or any other features conventionally located opposite the input device 42. The steering column assembly 44 may include at least two axially adjustable parts, for example, a first jacket 48 and a second jacket 50 that are axially adjustable with respect to one another. The first jacket 48 and the second jacket 50 may be alternatively configured as brackets, rails, or other members that permit axial movement therebetween. The axial movement may include sliding, telescopic, translating, and other axial movements. The steering column assembly 44 may include a bracket 51 that at least partially connects the steering column assembly 44 to the vehicle. An adjustable lever 52 is operatively connected to one of the first jacket 48, the second jacket 50, or the bracket 51 to facilitate axial or tilting adjustment of the steering column assembly 44. In some embodiments, behavior of the adjustable lever 52 may be controlled via a control system 300 including a CPU unit. In some embodiments, behavior of the adjustable lever 52 is controlled manually by a driver.

The steering column assembly 44 is moveable over a range of positions from an extended position to a retracted position. While it is contemplated that the second jacket 50 may be axially adjustable, the first jacket 48 is axially adjustable relative to the second jacket 50 to at least partially define the extended and retracted positions of the steering column assembly 44. For example, the first jacket 48 may be referred to as an "upper jacket" and the second jacket 50 may be referred to as a "lower jacket".

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operatively connected to the steering gear assembly 54, such that a rotation of the steering gear input shaft 56 causes a responsive movement of the output shaft 60 and causes the drive axle to turn the wheels 22. In other embodiments, the steering column assembly 44 is not directly mechanically connected to the steering gear assembly 54. Such an embodiment may be referred to as a steer-by-wire system.

Figure 2:
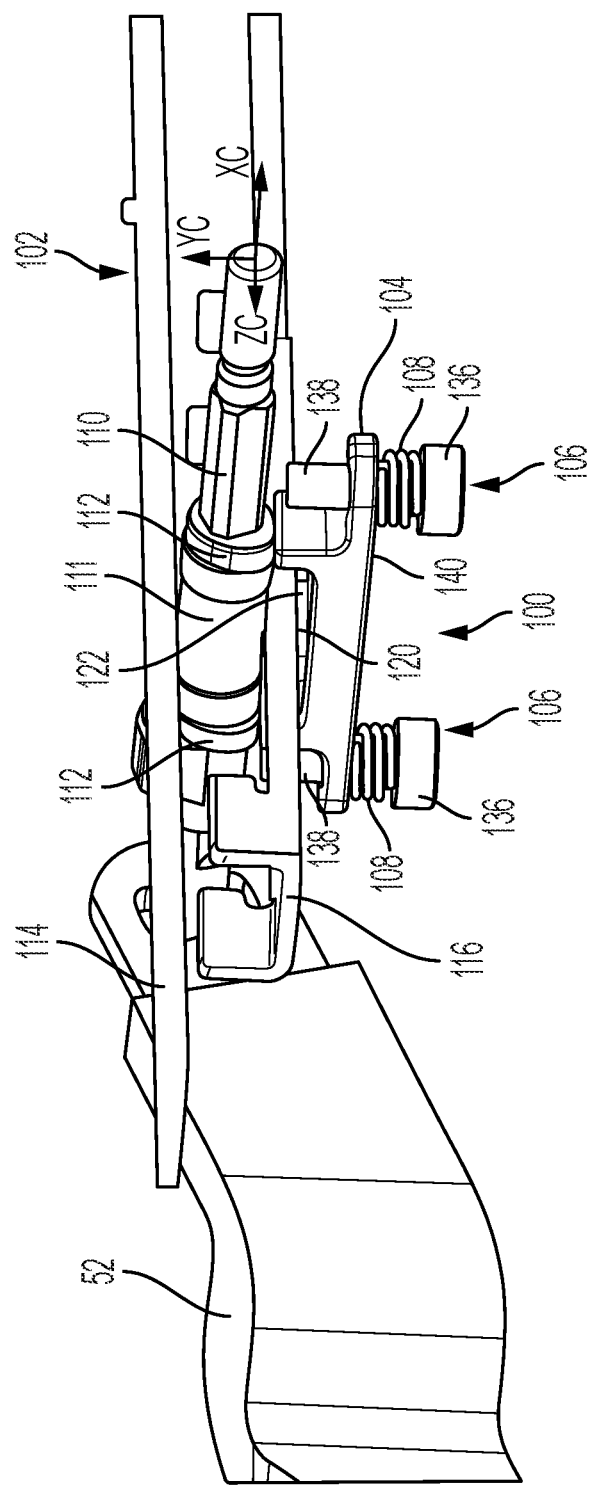
FIG. 2 is a perspective view of a steering column assembly having an energy absorption lock mechanism.

FIG. 2 generally illustrates the adjustable steering column assembly 44 with the lever 52 and a lock mechanism 100. The adjustable lever 52 is partially shown and extends from a free end (not shown) to a connection end 101 which is connected to the steering column assembly 44. The lock mechanism 100 includes a cam assembly (not shown) which biases the upper and lower jacket into an unlocked position upon rotation of the lever 52 to allow telescope adjustment of the upper jacket 48 relative to the lower jacket 50 and selectively locks the upper and lower jacket at a fixed position.

Figure 3:
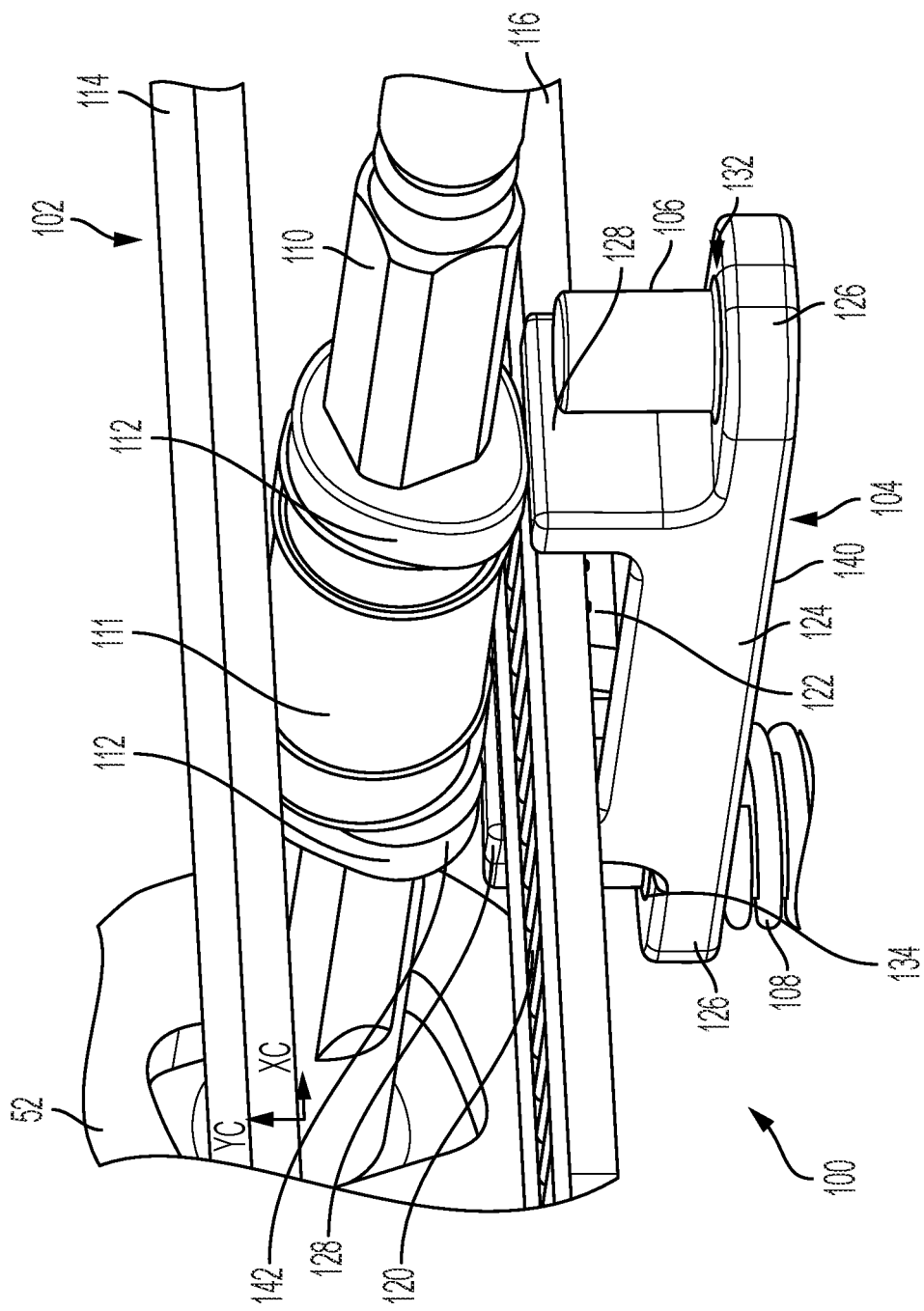
FIG. 3 is a perspective, enlarged view of a portion of FIG. 2, further illustrating aspects of the energy absorption lock mechanism.

Referring to FIGS. 2 and 3, the lock mechanism 100 includes an energy absorption strap 102, a teeth plate 104, a pair of mechanical fasteners 106, a pair of springs 108, a clamp bolt 110, a bumper spacer 111 and a pair of cams 112.

Figure 5:
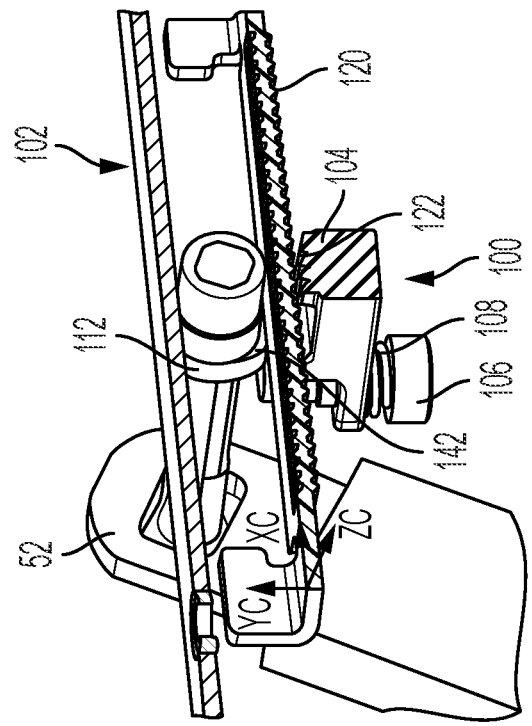
FIG. 5 is a perspective view of the energy absorption lock mechanism in an unlocked condition.

The energy absorption strap 102 is operatively coupled to the upper jacket 48 with one or more fasteners, or via welding. The energy absorption strap 102 includes a first leg 114, a second leg 116 and a curved transition portion (not shown) connecting the first leg 114 and the second leg 116. The first leg 114 is coupled to the upper jacket 48 and the second leg 116 includes a plurality of teeth 120 (referring also to FIGS. 4 and 5) configured to be selectively engaged by a plurality of teeth 122 of the teeth plate 104. The plurality of teeth 120 are formed on an outer side of the second leg 116 of the energy absorption strap 102. In particular, an engaged condition of the teeth 120 of the energy absorption strap 102 and the teeth 122 of the teeth plate defines the locked condition of the lock mechanism 100 (FIG. 4) and a disengaged condition of the teeth 120, 122 defines the unlocked position (FIG. 5). In the unlocked position of the lock mechanism 100, the energy absorption strap 102 is free to move axially in the telescope direction with the upper jacket 48 to which it is coupled, as described above.

The teeth plate 104 is operatively coupled to a relatively stationary component of the steering column assembly 44, such as the lower jacket 50, for example. The teeth plate 104 includes a main body portion 124, with a pair of lateral flanges 126 extending from the main body portion 124. A pair of inwardly extending segments 128 extend from the main body portion 124. The plurality of teeth 122 of the teeth plate 104 are formed on an inner side of the main body portion 124 and positioned between the inwardly extending segments 128. The inwardly extending segments 128 are each disposed on opposite sides of the second leg 116 of the energy absorption strap 102.

Each of the lateral flanges 126 defines a respective hole 132, 134 sized to receive one of the mechanical fasteners 106 therethrough. In some embodiments, the mechanical fasteners 106 are shoulder bolts or the like. Regardless of the particular type of mechanical fasteners 106 utilized, each fastener 106 includes a head portion 136 and a shank portion 138. The shank portion 138 extends through the holes 132, 134 and the head portion 136 is located on an outer side 140 of the teeth plate 104. Each mechanical fastener 106 has one of the springs 108 surrounding the portion of the shank portion 138 disposed between the head portion 136 and the outer side 140 of the teeth plate 104. The springs 108 may be a coil spring or any other suitable type of resilient member.

The springs 108 bias the teeth plate 104 toward the second leg 116 of the energy absorption strap 102 to result in the teeth 122 of the teeth plate 104 fully engaging the teeth 120 of the energy absorption strap 102. Therefore, the spring force and compression of the springs 108 must be contemplated to ensure secure engagement of the teeth 120, 122 as a default position of the lock mechanism 100. Utilization of symmetrically positioned springs 108 and mechanical fasteners 106 provide substantially balanced forces to more smoothly move the teeth plate 104 along the shank portions 138 of the fasteners 106 during movement between the locked position and the unlocked position. This smooth and balanced movement promotes secure engagement and disengagement of the teeth 120, 122 during operation.

The clamp bolt 110 is operatively coupled to the connection end 101 of the lever 52 and is rotatable therewith. Therefore, when the lever 52 is rotated from a locked position to an unlocked position, the clamp bolt 110 correspondingly rotates. The bumper spacer 111 is operatively coupled to, or integrally formed with, the clamp bolt 110 on an outer surface thereof. The bumper spacer 111 may be formed of a different material than the clamp bolt 110. Each of the pair of cams 112 are positioned at respective ends of the bumper spacer 111. Each of the cams 112 are aligned with one of the pair of inwardly extending segments 128. The cams 112 are rotationally fixed to the clamp bolt 110 such that the rotational orientation of the cams 112 result in allowing the teeth plate 104 to be in the locked condition of the lock mechanism 100 when the lever 52 is in the locked position and to bias the teeth plate 104—via contact with the inwardly extending segments 128—to the unlocked condition of the lock mechanism 100 when the lever 52 is in the unlocked position.

Figure 4:
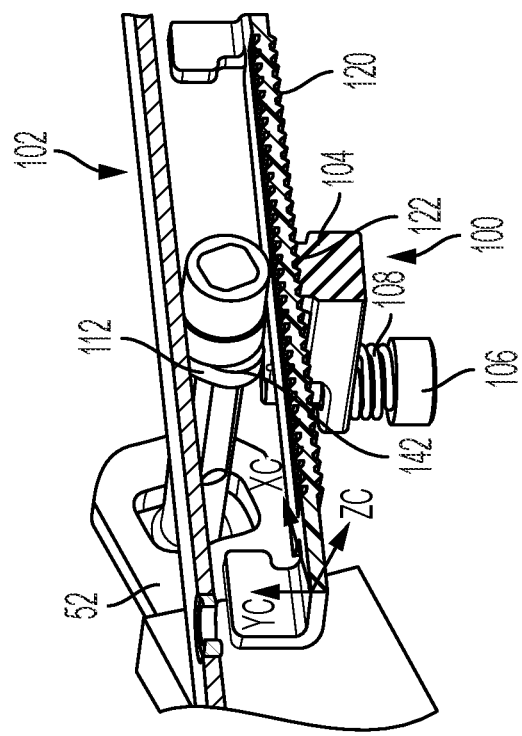
FIG. 4 is a perspective view of the energy absorption lock mechanism in a locked condition.

Referring now to FIGS. 4 and 5, the lock mechanism 100 is shown in a locked condition (FIG. 4) and an unlocked condition (FIG. 5). In particular, in the locked condition, the plurality of teeth 120 of the energy absorption strap 102 are meshingly engaged with the plurality of teeth 122 of the teeth plate 104. Engagement of the teeth 120, 122 prevent movement of the energy absorption strap 102—and therefore the upper jacket 48—in both directions (i.e., fore and aft) parallel to the longitudinal axis of the steering column assembly 44 since the teeth plate 104 is fixed to a stationary structure, such as the lower jacket 50, for example.

The cams 112 each include a biasing portion 142 that is positioned to move the teeth plate 104 outward (down in views of FIGS. 2-5) in the unlocked position and to allow inward movement (up in views of FIGS. 2-5) in the unlocked position via the spring force of springs 108. In operation, when the lever 52 is in the locked position, the cam 112 is oriented to allow the teeth plate 104 to be biased by the springs 108 to an extent sufficient to have the teeth 120 of the strap 102 engaged with the teeth 122 of the teeth plate 104. As the lever 52 is rotated to the unlocked position, the cam 112 is rotated to allow the teeth plate 104 to move outwardly to provide clearance between teeth 120 and teeth 122, thereby unlocking the steering column assembly 44.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. An axially adjustable steering column comprising:
   an upper jacket;
   a lower jacket, wherein the upper jacket is axially adjustable relative to the lower jacket;
   an adjustment lever; and
   a lock mechanism, wherein the adjustment lever selectively moves the lock mechanism between a locked position and an unlocked position, wherein the locked position prevents axial adjustment of the upper jacket relative to the lower jacket in both axial directions, and the unlocked position allows adjustment of the upper jacket relative to the lower jacket, the lock mechanism comprising:
      an energy absorption strap having a first plurality of teeth formed thereon, wherein the energy absorption strap comprises:
         a first leg; and
         a second leg, wherein the first plurality of teeth are formed on an outer side of the second leg;
      a teeth plate having a second plurality of teeth formed thereon, wherein the teeth plate comprises:
         a main body portion;
         a pair of lateral flanges extending from the main body portion; and
         a pair of inwardly extending segments extending from the main body portion, wherein the second plurality of teeth are formed on an inner side of the main body portion and positioned between the pair of inwardly extending segments;
      a clamp bolt operatively coupled to the adjustment lever;
      a first cam operatively coupled to the clamp bolt, wherein rotation of the adjustment lever causes rotation of the first cam, wherein rotation of the first cam selectively moves the second plurality of teeth into and out of engagement with the first plurality of teeth to define the locked position and the unlocked position, respectively; and
      a pair of mechanical fasteners, wherein each of the pair of mechanical fasteners extends through a respective hole defined by each of the pair of lateral flanges of the teeth plate; and
      a pair of springs, wherein each of the pair of springs is disposed on a shank portion of one of the pair of mechanical fasteners, wherein the pair of springs are in contact with an outer side of the teeth plate to bias the teeth plate to the locked position of the lock mechanism.

2. The axially adjustable steering column of claim 1, wherein the clamp bolt extends between the first leg and the second leg of the energy absorption strap.

3. The axially adjustable steering column of claim 1, wherein the pair of inwardly extending segments are each disposed on opposite sides of the second leg of the energy absorption strap.

4. The axially adjustable steering column of claim 1, wherein each of the pair of springs are disposed between the outer side of the teeth plate and a head portion of the mechanical fasteners.

5. The axially adjustable steering column of claim 1, wherein the first cam is aligned with one of the pair of inwardly extending segments of the teeth plate, further comprising a second cam operatively coupled to the clamp bolt and aligned with the other of the pair of inwardly extending segments.

6. The axially adjustable steering column of claim 5, wherein the first cam and the second cam are rotationally oriented to allow the teeth plate to be in the locked position of the lock mechanism and to move the teeth plate to the unlocked position of the lock mechanism by contacting the pair of inwardly extending segments to overcome a force of the pair of springs.

7. A lock mechanism for a steering column assembly comprising:
   an energy absorption strap having a first plurality of teeth formed thereon;
   a teeth plate having a second plurality of teeth formed thereon;
   a pair of springs in contact with an outer side of a teeth plate, the pair of springs biasing the teeth plate to a locked position, the locked position defined by engagement of the first plurality of teeth with the second plurality of teeth; and
   a pair of cams in contact with an inner side of the teeth plate, wherein rotation of the pair of cams moves the second plurality of teeth out of engagement with the first plurality of teeth to define the unlocked position.

8. The lock mechanism of claim 7, wherein the energy absorption strap comprises:
   a first leg; and
   a second leg, wherein the first plurality of teeth are formed on an outer side of the second leg.

9. The lock mechanism of claim 8, wherein the teeth plate comprises:
   a main body portion;
   a pair of lateral flanges extending from the main body portion; and
   a pair of inwardly extending segments extending from the main body portion,
   wherein the second plurality of teeth are formed on an inner side of the main body portion and positioned between the pair of inwardly extending segments.

10. The lock mechanism of claim 9, wherein the pair of inwardly extending segments are each disposed on opposite sides of the second leg of the energy absorption strap.

11. The lock mechanism of claim 9, further comprising a pair of mechanical fasteners, wherein each of the pair of mechanical fasteners extends through a respective hole defined by each of the pair of lateral flanges of the teeth plate, and wherein each of the pair of springs is disposed on a shank portion of one of the pair of mechanical fasteners, wherein the pair of springs are in contact with an outer side of the teeth plate to bias the teeth plate to the locked position of the lock mechanism.

12. The lock mechanism of claim 11, wherein each of the pair of springs are disposed between the outer side of the teeth plate and a head portion of the mechanical fasteners.

13. The lock mechanism of claim 9, wherein one of the pair of cams is aligned with one of the pair of inwardly extending segments of the teeth plate, wherein the other of the pair of cams is aligned with the other of the pair of inwardly extending segments.

14. The lock mechanism of claim 13, wherein the pair of cams are rotationally oriented to allow the teeth plate to be in the locked position of the lock mechanism and to move the teeth plate to the unlocked position of the lock mechanism by contacting the pair of inwardly extending segments to overcome a force of the pair of springs.

* * * * *